United States Patent [19]

Kurokawa et al.

[11] Patent Number: 4,969,119
[45] Date of Patent: Nov. 6, 1990

[54] SEQUENCE CONTROLLER

[75] Inventors: Naohiro Kurokawa; Ryoichi Abe, both of Shibata; Tatsuo Fujiwara, Niigata, all of Japan

[73] Assignee: Hitachi, Ltd., Tokyo, Japan

[21] Appl. No.: 464,213

[22] Filed: Feb. 7, 1983

[30] Foreign Application Priority Data

May 12, 1982 [JP]   Japan ................................. 57-78280

[51] Int. Cl.[5] .......................... G06F 9/00; G05B 11/01
[52] U.S. Cl. ................................. 364/900; 364/926.9;
                                                  364/949; 364/140
[58] Field of Search ... 364/140, 141, 147, 200 MS File,
                                                  364/900 MS File

[56] References Cited

U.S. PATENT DOCUMENTS

| 3,832,696 | 8/1974 | Nakao | 364/900 |
|---|---|---|---|
| 3,944,987 | 3/1976 | Koyanagi et al. | 364/900 |
| 3,996,565 | 12/1976 | Nakao | 364/900 |
| 4,021,783 | 5/1977 | Highberger | 364/900 |
| 4,038,533 | 7/1977 | Dummermuth | 364/900 |
| 4,048,622 | 9/1977 | Yomogida | 364/900 |
| 4,107,785 | 8/1978 | Seipp | 364/900 |
| 4,144,562 | 3/1979 | Cooper | 364/200 |
| 4,282,584 | 8/1981 | Brown | 364/900 |
| 4,302,820 | 11/1981 | Struger et al. | 364/900 |
| 4,303,990 | 12/1981 | Seipp | 364/900 |
| 4,415,965 | 11/1983 | Imazeki et al. | 364/900 |

OTHER PUBLICATIONS

Paul Lamar, "Circuit Simplifies Industrial Control", *EDN*, vol. 26, No. 4, Feb. 1981, pp. 155-156.

*Primary Examiner*—Raulfe B. Zache
*Attorney, Agent, or Firm*—Antonelli, Terry, Stout & Kraus

[57] ABSTRACT

In processing a sequence program for a normally closed contact, the input signal is logically inverted before processing, inversion not being required for a normally open contact. A logical inversion circuit is provided for logically inverting an input signal corresponding to the normally closed contact designation of the sequence program before the input signal is fed to a central processing unit, so that inversion processing in the central processing unit can be dispensed with and the operation speed can be increased. The application of a logical inversion signal to the logical inversion circuit can readily be effected by utilizing an address line of the central processing unit.

8 Claims, 3 Drawing Sheets

F I G. 1
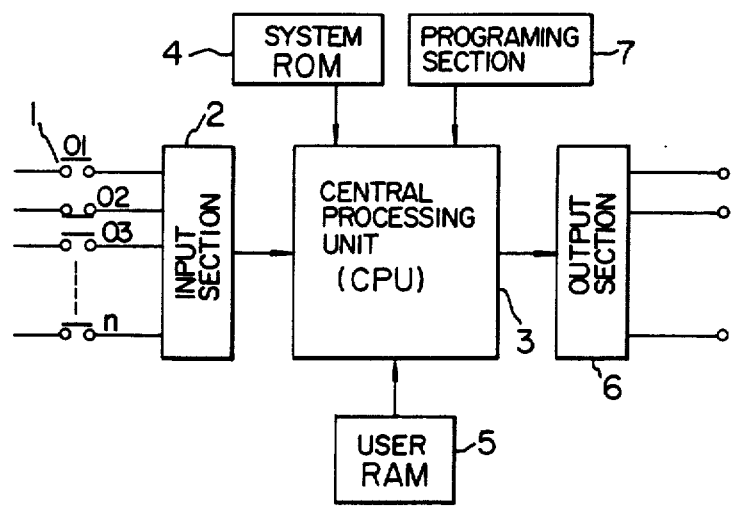
F I G. 2
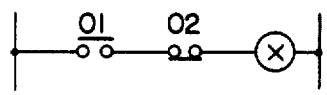
F I G. 3a    F I G. 3b
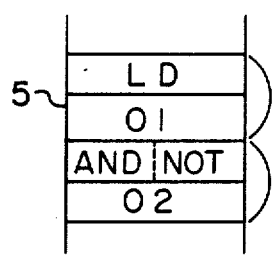    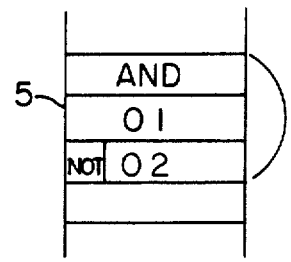

ns 21 and 22 each constitute a data selector integrated circuit which is activated by an address signal on an address line A0-2 leading from the CPU 3 to select any one of input lines included in the input signal source 1 and connected to the input sections. A decoder 32 is activated by an address signal on an address line A3-4

SEQUENCE CONTROLLER

BACKGROUND OF THE INVENTION

This invention generally relates to a technique of logical inversion of input/output signals in accordance with program designation in a programmable sequence controller and more particularly to such a sequence controller which is suitable for high speed control.

Conventionally, a sequence control circuit based on the operations of relays has employed relay contacts, especially NO (normally open) contacts and NC (normally closed) contacts in combination, to constitute a complicated control circuit, which is liable to suffer from many inconveniences particularly in altering a connection. Therefore, in recent years, various types of sequence control apparatus formed primarily of semiconductor circuits and which are programmable (hereinafter referred to as a sequence controller) have been proposed.

In the typical sequence controller, programming and logical operation for the NC contact have been performed in various ways.

For example, the sequence controller has a basic construction as shown in FIG. 1, which comprises an input signal source 1 having a contact 01 (NO contact), a contact 02 (NC contact), a contact 03 (NO contact) . . . , and a contact n (NO contact), an input section 2, a central processing unit (CPU) 3 for performing logical operations based on programmed sequence data stored in a user RAM 5, a system ROM 4 for storing instructions for controlling the processing in the CPU, an output section 6 for delivery of operation results from the CPU to an external unit, and a programming section 7 for the programming contents of the sequence.

In the sequence controller constructed as described above, information regarding the contacts of a sequence circuit as shown in FIG. 2 is stored in the user RAM in various formats, for example, as shown in FIGS. 3a and 3b.

With reference to FIG. 3a, an instruction word LD indicates that a contact signal representative of an input signal 01 following the instruction word shall be "inputted", and an instruction word ANDNOT indicates that a contact signal representative of an input signal 02 following the instruction word shall be "inputted, inverted and thereafter ANDed". These instruction words are defined by specified codes.

Thus, in accordance with the processing procedure stored in the system ROM 4, the CPU 3 first reads the instruction word LD of the contents stored in the user RAM 5 and interprets the instruction word as "be inputted", then proceeds with "reading the input code 01" and generating an input signal corresponding to the code 01 of the input signal source, and thereafter reads the contact signal.

Subsequently, the processing proceeds to read and interpret the instruction word ANDNOT, read the input code "02", and generate a corresponding input signal and read the contact signal as in the preceding operation. Thereafter, in this case, the contact signal is inverted and ANDed with the previous input contact signal (01). In this manner, all the operations are carried out in accordance with the processing procedures stored in the system ROM 4.

When using the format shown in FIG. 3b, a similar processing is carried out. In this case, a code for inversion is defined in part of an input number, and an instruction word AND is defined to indicate that "the following input signals shall be ANDed". Apart from the above, the operations resemble those described with reference to FIG. 3a.

As will be seen from the foregoing, in the prior art apparatus, the sequence program for processing the NC contact signal is more sophisticated than for processing the NO contact signal. Moreover, the CPU 3 needs to be supplied from the ROM 4 with a processing procedure (instruction) indicating that "the NC contact signal shall be inverted", resulting in the serious problem that the processing time is prolonged.

SUMMARY OF THE INVENTION

An object of the present invention is to provide a programmable sequence controller capable of performing high speed processing.

Another object of the invention is to provide a programmable sequence controller capable of performing high speed processing with an extremely simplified circuit.

Perceiving the fact that the sequence program for the NC contact involves inputting of an inversion signal of an input signal, the present invention provides a sequence controller with a logical inversion circuit for the input signal. Address lines of a CPU are utilized to provide signals for controlling the logical inversion circuit. The manner of storage for a user RAM is devised to generate the control signals on the address lines.

BRIEF DESCRIPTION OF THE DRAWINGS

The present invention will now be explained in detail in conjunction with the accompanying drawings, in which:

FIG. 1 is a block diagram showing a basic construction of a programmable sequence controller;

FIG. 2 shows a sequence circuit useful to explain a prior art sequence controller;

FIGS. 3a and 3b show sequence program formats for the sequence circuit of FIG. 2;

Referring now to FIGS. 4, 5a and 5b, a preferred embodiment of the present invention will be described.

DESCRIPTION OF THE PREFERRED EMBODIMENTS

Figure 4:
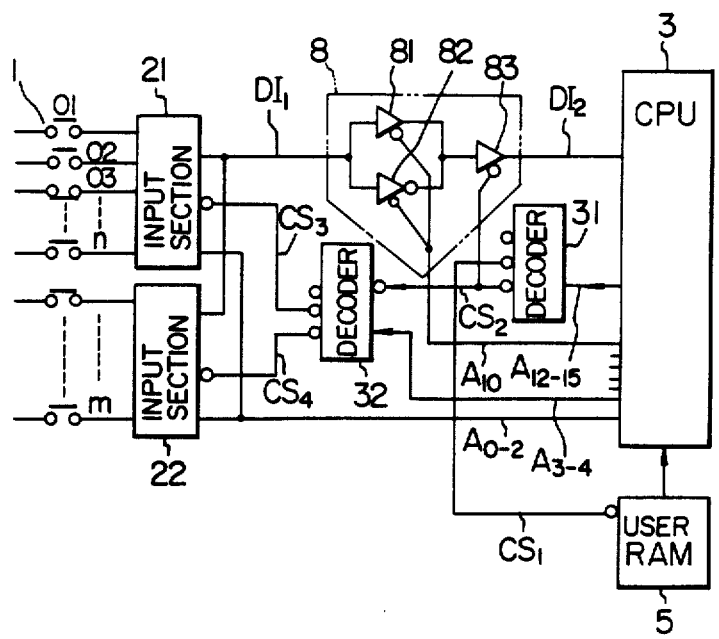
FIG. 4 is a block diagram of a sequence controller embodying the invention.

A circuit shown in FIG. 4 specifically illustrates components ranging from an input signal source to a CPU and therein, the same components as those of FIG. 1 are designated by the same reference numerals. Input sections 21 and 22 each constitute a data selector integrated circuit which is activated by an address signal on an address line A0-2 leading from the CPU 3 to select any one of input lines included in the input signal source 1 and connected to the input sections. A decoder 32 is activated by an address signal on an address line A3-4 leading from the CPU to select one of the input sections through chip select line CS3 or CS4. A decoder 31 is responsive to an address signal on an address line A12-15 leading from the CPU to alternatively select each component of the system. In FIG. 4, the decoder 31 alternatively selects a user RAM 5 or the decoder 32 through a chip select line CS1 or CS2. Data lines DI1 and DI2 are connected to transmit data signals from the input sections 21 and 22 to the CPU 3.

In accordance with the present invention, a logical inversion circuit 8 is newly provided. It includes a gate 81 which when activated, sends a received data signal, as it is, to a succeeding stage, and an inverter gate 82 which when activated, inverts a received data signal and sends it to the succeeding stage. These gates 81 and 82 are normally closed and opened by an address signal on an address line A10 leading from the CPU. The logical inversion circuit 8 also has a gate 83 which sends the data signal to the CPU when one of the input sections is selected. The gate 83 will be brought into three states, i.e., "1", "0" or "high impedance" in order to avoid interference with the other data lines not shown.

Figure 5A:
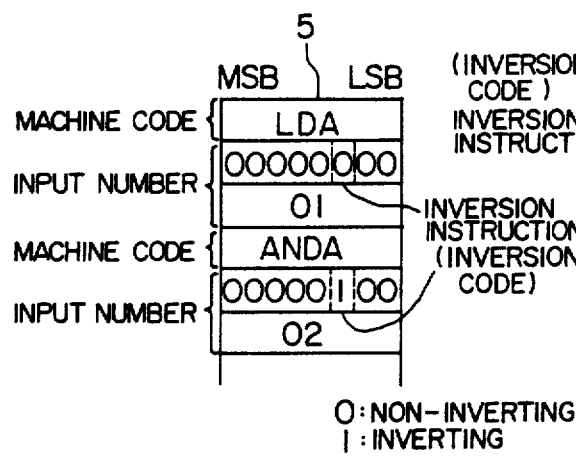
FIGS. 5a and 5b show sequence program formats for the sequence controller of FIG. 4.
Figure 5B:
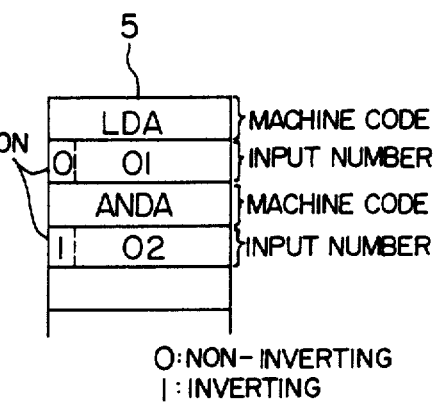

The user RAM 5 stores, in advance, program contents requested by the user. Specifically, sequence contents in the form of formats as shown in FIGS. 5a and 5b are stored in the user RAM. More particularly, as shown in FIGS. 5a and 5b, instruction words take the form of "machine codes" (LDA, ANDA) which can be read and executed by the CPU directly, and input numbers are "effective addresses" which contain inversion instructions (inversion codes) adapted to invert input signals corresponding to the input numbers. Thus, a CPU machine code LDA instructs that data shall be read from an address designated by an operand (contents which follow the machine code), and a CPU machine code ANDA instructs that data shall be read from an address designated by an operand and ANDed with the previous results. Especially, the input number shown in FIG. 5a is constructed by two lines (8 bits per line) following LDA or ANDA and has 16 bits in total. It is now assumed that the 0-th bit to the seventh bit are aligned from right to left in the lower line of the input number and the eighth bit to the fifteenth bit are aligned from right to left in the upper line. The input number "01" is constituted by "1" and "0" in which "1" is represented by the 0-th to the third bits and "0" is represented by the fourth to the seventh bits. An inversion instruction (which is "1" for inversion) is represented by the tenth bit.

In operation, the CPU sequentially executes processing procedures designated by the user RAM 5 and because of the "machine codes" and "effective addresses" formulated as above, the CPU executes its basic functions. Namely, the CPU reads and executes a machine coded instruction, reads an operand (contents following the machine code), directly delivers address information corresponding to the operand onto an address line, and reads data corresponding to the delivered address information (representative of a signal state in the input signal source), so that processing in accordance with the machine code and operand can be carried out at high speed. Accordingly, the CPU operates for processing in accordance with the format of FIG. 5a in the following manner.

Firstly, the CPU reads the machine code LDA and determines that data shall be read from an address designated by the operand, and sequentially reads the contents of the operand to generate the read-out contents on address lines $A_0$ to $A_{15}$. In this case, the decoders 31 and 32 select the line CS2 or CS3 and the address signal on the address line A0-2 causes the input section 21 to select the input signal 01 which in turn is delivered onto the data line DI1. Since the tenth bit of the input number is now "0", the inversion signal is fed through the address line A10 (inversion code bit) to select the gate 81 (non-inverted gate), and a signal on the line CS2 opens the gate 83. As a result, the contents of the input signal 01, as they are, are transmitted to the succeeding CPU 3.

When the above CPU processing has been completed, the CPU reads a next machine code (ANDA) and determines that "the previous results shall be ANDed with data at an address designated by the operand". Thereafter, an address signal is delivered to the address line to select the input signal 02 and the data is read. Since, in this case, an address signal on the address line A10 (inversion code bit) is "1", the gate 82 (inversion gate) is selected and hence the data is inverted (NOT), transmitted through the gate 83 to the succeeding CPU 3 and ultimately, ANDed with the previous signal information.

In this manner, processing is carried out sequentially. When the final processing for the user RAM 5 has been completed, the processing returns to start and repeats the same program at high speed.

Although, in the embodiment described with reference to FIGS. 4 and 5a, the address signal on the address line A10 for the tenth bit is used as the inversion code bit, another bit corresponding to another address line which is not in use in accordance with the construction of the system may be used for the same purpose. It will be appreciated that in any case an address signal on an address line corresponding to an inversion code bit may be stored in the user RAM 5.

In accordance with the basic function of the CPU 3, the format of FIG. 5b may be employed. In this format, bits of the input number and a bit of the inversion code are arranged in one line of the user RAM 5, with the heading bit defined as the inversion code bit. Accordingly, in this case, the inversion code bit is fed from an address line which is different from the address line A10 for the FIG. 4 embodiment.

The foregoing embodiments have been described by way of an external input signal source but the present invention may of course be applied to a case wherein various internal input/output signals of the system are similarly processed by the logical inversion circuit.

Further, the address line and the data line of the CPU are separate from each other in the foregoing embodiments but the address and data lines may be multiplexed and in order to accomplish the operation that is intended by the present invention, an address line (inversion code bit) may be latched.

Furthermore, the range of the input/output number (contact number) may be expanded by changing the position of the inversion code bit. For example, by changing the address line A10 for the inversion code bit to an address line A11, the contact number can be increased from 1024 to 2048.

Another embodiment of the invention will now be described with reference to FIGS. 6, 7 and 8.

Figure 6:
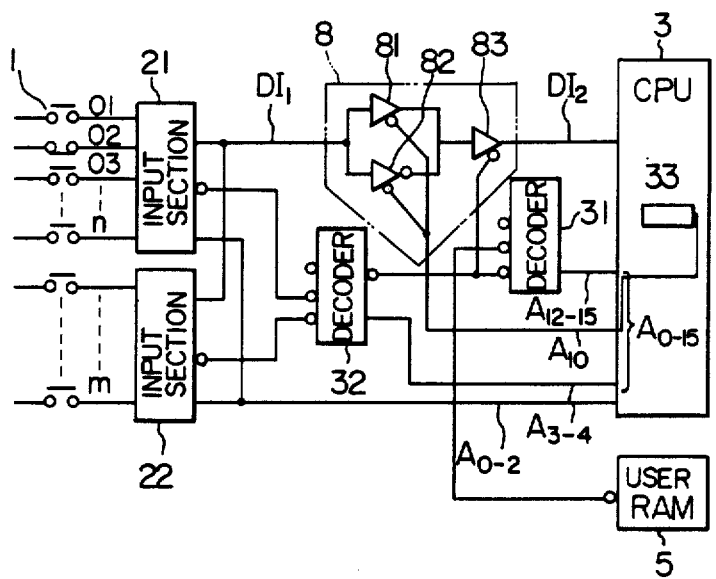
FIG. 6 is a block diagram of another embodiment of the sequence controller according to the invention.
Figure 7:
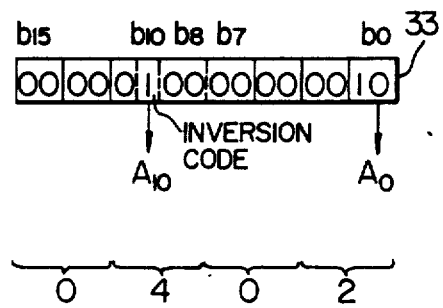
FIG. 7 is a diagrammatic representation showing a storage state of a register included in a CPU in the embodiment of FIG. 6.

FIG. 7 shows contents of an internal register 33 included in a CPU 3 as shown in FIG. 6. The register 33 is a modifiable register of 16-bit length. One of the 16 bits, for example, a tenth bit (b10) is used as an inversion code bit, with all the remaining bits being "0".

Figure 8:
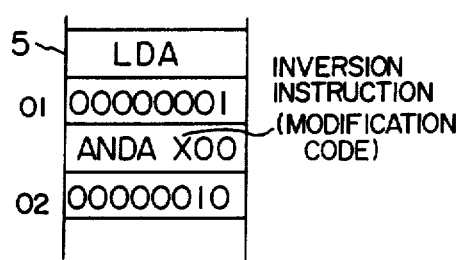
FIG. 8 is a diagrammatic representation showing a storage state of a user RAM in the FIG. 6 embodiment.

FIG. 8 shows a sequence program to be stored in the user RAM 5 when the inversion code contained in the user RAM of the foregoing embodiments is deleted. Thus, a modification code in a CPU machine code ANDAX is used as a logical inversion instruction.

With the above sequence program, the CPU operates as follows.

Firstly, the CPU 3 reads a machine code or the heading instruction word LDA of the user RAM 5 as in the foregoing embodiments, generates address information representative of the contents of the following operand (in this case, input number 01) onto address lines A0 to A15 (an address signal on the address line A10 being "0"), and receives a contact signal on a data line DI 2. The internal register 33, however, has nothing to do with this processing.

Subsequently, the CPU 3 reads the machine code ANDAX. Since the contents of the internal register 33 and the following operand, i.e., 0402 (in terms of hexadecimal) constitute address information as described previously, an inversion signal of "1" is generated on the address line A10 of the address lines A0 to A15. This address line A10 corresponds to the inversion code bit of the internal register 33, and this inversion signal controls the logical inversion circuit so that the inversion gate 82 operates to invert an input signal and the inverted input signal is transmitted to the CPU 3. And, the previous contents are ANDed with the present input signal at the CPU 3.

In this manner, processing of the CPU 3 is carried out sequentially at high speed in accordance with the sequence program stored in the user RAM 5. When the final processing has been completed, the processing returns to start and repeats the same program.

Since in this embodiment the inversion code is arranged in the modifiable internal register 33 and the modification code is provided for the CPU machine code within the user RAM 5, easy logical inversion of the input/output signal can be assured and a great number of sequence programs can be stored in the user RAM 5. For example, for 1K bytes as in the foregoing embodiments, the capacity of the user RAM can be calculated as, $$1024 \div 2 = 512 \text{ (program number)}$$

which is 1.5 times the program number in the foregoing embodiments. It will be appreciated that in the first embodiment 3 bytes per one instruction word are needed and the capacity of the user RAM 5 for 1K bytes is calculated as, $$1024 \div 3 = 341 \text{ (program number)}.$$

In this embodiment, the inversion code is arranged at the bit b10 of the internal register 33 and the corresponding address line A10 is used but the arrangement of the inversion code may be determined desirably in accordance with the system construction.

The logical inversion circuit is adapted for the input signal in this embodiment but it may be of course be adapted for the output signal in a similar manner.

As has been described, according to the present invention, the time for processing the NC contact in the sequence circuit by using the simplified logical inversion circuit 8 and the optional address line (inversion code bit) for controlling the logical inversion circuit, can be reduced, and after the CPU has read out the input signal which has been previously processed (inverted), the CPU can immediately perform logical operations on the basis of machine codes stored in the memory, thereby increasing the operation speed.

What is claimed is:

1. A sequence controller comprising:
    input means connectable to a plurality of input devices for receiving input signals from said input devices, output means connectable to at least one output device for providing an output signal to said output device;
    memory means for storing programmed sequence data including instruction words in the form of machine codes and associated input numbers forming addresses of respective input devices and containing logical inversion instructions adapted to selectively invert input signals from input devices addressed by said input numbers;
    a central processing unit connected to said memory means and said input means and said output means for performing logical operations on input signals received from an input device via said input means on the basis of the programmed sequence data stored in said memory means and for delivering the results of the logical operation to said output means, including a plurality of address lines for carrying said input numbers;
    means including a logical inversion circuit connected between said input means and said central processing unit and responsive to a signal on a predetermined address line of said central processing unit for logically inverting selected input signals from said input means prior to application of said selected input signals to said central processing unit;
    said central processing unit further including means for successively reading from said memory means an instruction word and an associated input number, and means for directly executing said instruction word and for applying said input number to said address lines, thereby to deliver address signals to said input means for selecting an input signal of an addressed input device and to deliver said logical inversion instruction in the input number to said logical inversion circuit through said predetermined address line, said logical inversion circuit logically inverting the addressed input signal or not depending on said logical inversion instruction.

2. A sequence controller according to claim 1, wherein said logical inversion instruction is stored in said memory means at a bit position of each input number corresponding to the position of said predetermined address line in said plurality of address lines.

3. A sequence controller according to claim 1, wherein said input devices include normally closed relay contacts and normally open relay contacts, said logical inversion circuit comprises means responsive to said logical inversion instruction for logically inverting the input signal obtained from a normally closed contact and for passing without alteration the input signal obtained from a normally open contact.

4. A sequence controller according to claim 1, wherein said logical inversion circuit includes first gate means connected to said input means for transmitting a received input signal, second gate means connected to said input means for inverting said received input signal, and third gate means connected to receive both the outputs of said first and second gate means for selectively transmitting one of the output signals of said first and second gate means to said central processing unit, said third gate means being provided in the form of a gate capable of being brought into one of three different states "1", "0", or "high impedance" in response to signals on at least one other predetermined address line.

5. A sequence controller according to claim 4, wherein said input means comprises first and second input sections each constituting a data selector circuit activated by address signals on one or more address lines from said central processing unit to select the input signal of one of said input devices.

6. A sequence controller according to claim 5, further including a first decoder activated by an address signal on an address line from said central processing unit to select one of said first and second input section; a second decoder activated by another address signal on another address line from said central processing unit for alternately inhibiting said memory means and said first decoder and for inhibiting said logical inverting circuit at the same time said first decoder is inhibited; wherein said central processing unit activates said second decoder to select said first decoder and said third gate means, and also activates one of said first and second gate means, whereby an input signal corresponding to an addressed input device is sent to said central processing unit through the selected first or second input section, the selected one of said first and second gate means and said third gate means during the execution by said central processing unit of an instruction word read from said memory means.

7. A sequence controller according to claim 6, wherein said third gate means is brought into the states of "0" or "1" to send the input signal to said central processing unit when one of said first and second input sections is selected, and is brought into the state of "high impedance" to block said input signal from said central processing unit when said memory means is being read.

8. A sequence controller according to claim 1, wherein said memory means is a user RAM.

* * * * *